US012606744B2

(12) United States Patent
Bennett et al.

(10) Patent No.: US 12,606,744 B2
(45) Date of Patent: Apr. 21, 2026

(54) ZINC PIGMENT FOR WATERBORNE CORROSION COATINGS

(71) Applicant: Sun Chemical Corporation, Parsippany, NJ (US)

(72) Inventors: Jami Bennett, Cincinnati, OH (US); Jonathan Doll, Cincinnati, OH (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 310 days.

(21) Appl. No.: 18/208,973

(22) Filed: Jun. 13, 2023

(65) Prior Publication Data

US 2023/0340327 A1 Oct. 26, 2023

Related U.S. Application Data

(63) Continuation of application No. PCT/US2021/063421, filed on Dec. 15, 2021.

(60) Provisional application No. 63/125,431, filed on Dec. 15, 2020.

(51) Int. Cl.

| | |
|---|---|
| ***C09K 15/30*** | (2006.01) |
| ***C09D 5/10*** | (2006.01) |
| ***C09D 7/40*** | (2018.01) |
| ***C09D 7/62*** | (2018.01) |
| ***C09D 7/63*** | (2018.01) |
| ***C09D 11/037*** | (2014.01) |
| ***C09K 15/02*** | (2006.01) |

(52) U.S. Cl.

CPC .............. *C09K 15/30* (2013.01); *C09D 5/106* (2013.01); *C09D 7/62* (2018.01); *C09D 7/63* (2018.01); *C09D 7/69* (2018.01); *C09D 7/70* (2018.01); *C09D 11/037* (2013.01); *C09K 15/02* (2013.01)

(58) Field of Classification Search

None

See application file for complete search history.

(56) References Cited

U.S. PATENT DOCUMENTS 5,001,173 A * 3/1991 Anderson ................ C08K 3/22 428/416
5,624,076 A * 4/1997 Miekka ..................... C09C 3/04 241/3
2004/0194663 A1* 10/2004 Li ............................ A61K 8/19 106/404
2010/0197836 A1* 8/2010 Price ....................... C09D 5/106 524/80
2011/0179971 A1* 7/2011 Proelss ................... C09C 1/627 106/287.18

FOREIGN PATENT DOCUMENTS

JP S59150001 A * 8/1984 ............ B22F 1/0059
JP H11323181 A * 11/1999 ............... C09C 1/62
KR 20130130242 A * 12/2013 .............. C08L 83/04

OTHER PUBLICATIONS

Yoshitake—JP S59-150001 A—MT—azole coated copper powder—1984 (Year: 1984).*
Nakazato—JP H11-323181 A—MT—metallic pigment for ink—1999 (Year: 1999).*
Mueller—Heterocyclic corrosion inhibitors—PCT D1—Pigment & Resin Tech—2000 (Year: 2000).*
Bang—KR 2013-0130242 A—MT—zinc powder primer paint—2013 (Year: 2013).*
PubChem—1H-Benzotriazole—Oct. 6, 2025 (Year: 2025).*
International Search Report and Written Opinion for PCT/US2021/063421 dated Dec. 15, 2021, 8 pages.
Gadow et al; "Electrochemical Study on the Efficiency of Curcuma Extract as a Green Inhibitor for Corrosion of Alpha-Brass in 1MHC1", Int. J. Electrochem, Sci., vol. 12 Jun. 12, 2017 (Jun. 12, 2017), pp. 5867-5887, XP002806106, DOI: 10.20964/2017.07.13 the whole document.
Lamaka S V et al.; "Comprehensive Screening of Mg Corrosion Inhibitors", Corrosion Science, Oxford, GB, vol. 128, Jul. 25, 2017 (Jul. 25, 2017), pp. 224-240, XP 085208303, ISSN: 0010-938X, DOI: 10.1016/J.Corsci.2017.07.011 Conclusions; p. 238.
Muller et al.; "Heterocyclic Corrosion Inhibitors for Aluminum and Zinc Pigments", Pigment and Resin Technology, vol. 29, No. 5, Oct. 1, 2000 (Oct. 1, 2000), pp. 268-272, XP055905555, UK ISSN: 0369-9420, DOI: 10.1108/03699420010353519 the whole document.
Rajendran S. et al.; "Corrosion Inhibition by an Aqueous Extract of Rhizome Powder", Corrosion, National Association of Corrosion Engineers, Nace, US, vol. 61, No. 7. Jul. 1, 2005 (Jul. 1, 2005), pp. 685-692, XP 001233991, ISSN: 0010-9312, the whole document.

* cited by examiner

*Primary Examiner* — John Vincent Lawler
(74) *Attorney, Agent, or Firm* — FBT Gibbons LLP

(57) ABSTRACT

A treated zinc pigment that provides cathodic corrosion protection in aqueous zinc-rich coatings is described. The treated zinc pigment shows reduced gas generation in aqueous formulation.

15 Claims, No Drawings

ZINC PIGMENT FOR WATERBORNE CORROSION COATINGS

BACKGROUND

Structural damage due to corrosion of a metal is one of the costliest failure modes of metal structures. The strategies used to prevent ferrous metal corrosion include the use of zinc-rich coatings. Zinc-rich coatings are typically solvent borne coatings containing a high content of metallic zinc particles that provide both cathodic and anodic protection to a steel surface. When micronized zinc particles are dispersed in water, they corrode, leading to a degradation of quality and the release of hydrogen gas. While many coating manufacturers would like a zinc pigment that can be formulated into waterborne systems, the technology is currently limited to: 2-part (2K) systems that require more manual effort by the user and have a short (~24 hour) shelf life, or surface treating the zinc particles. These treatments passivate the zinc particles, stabilizing them to corrosion, an reducing their capacity for anodic protection.

The rate of corrosion is enhanced by electrochemical processes occurring on a metal's surface. Zinc-rich coatings form a zinc-steel electrochemical cell with zinc and steel, becoming the anode and cathode, respectively. The protection mechanism has two phases. First, in the cathodic phase, the zinc sacrificially corrodes forming an impermeable and nonconductive ZnO barrier layer. With the formation of the barrier layer, the corrosion prevention mechanism switches from cathodic to anodic. If the ZnO barrier layer is damaged, the cathodic phase restarts and the defect is healed repairing the barrier.

Most zinc-rich coatings are made using solvent-based systems. In recent years, regulations around the world have forced coatings manufacturers to consider and use water-based alternatives to the solvent-based coatings. However, zinc pigments are reactive in water and corrode in storage causing them to lose their ability to provide cathodic protection to steel. Moreover, corrosion of zinc produces hydrogen gas, which can cause container failure, foaming, or in extreme cases may cause an explosion. To formulate zinc pigments into a waterborne system, the pigments must either be passivated or be formulated as a component to be added prior to application of the paint by the end user.

Modes of metal particle passivation are well known, however traditional passivation methods cannot be used on zinc pigments because they render the zinc nonconductive and reduce the ability to provide cathodic protection.

Prior work related to treated zinc pigments for waterborne zinc-rich coatings describe permanent treatment(s) which impede zinc's ability to provide cathodic protection by creating a physical barrier between the zinc pigment and the metal substrate. It would be particularly advantageous for waterborne applications if a zinc pigment can stabilized for storage in a waterborne coating, while becoming active once it is applied to a substrate.

BRIEF SUMMARY

Zinc-rich coatings contain metallic zinc pigments and are applied to metal substrates to provide corrosion protection. Zinc-rich coatings provide both barrier (anodic) protection and cathodic protection to the substrate. Cathodic protection is an electrochemical process whereby the zinc pigments act as a sacrificial component within the coating system to protect the underlying metal substrate. The application of zinc-rich coatings is currently limited to solvent-borne systems because waterborne systems cause the zinc pigments to oxidize, reducing their effectiveness and generating hydrogen gas. Existing waterborne zinc pigment coatings have a shelf-life of a few days and are not suitable for long-term storage. Passivation of the zinc pigments can mitigate the oxidation and gassing, but it does so at the expense of the zinc pigment's activity.

The present development addresses this issue by treating the zinc pigment with a transient treatment that deactivates after application to a substrate. The present development describes a treatment for zinc metal which is temporary. Once the zinc pigment is applied to a part in a coating, it becomes activated, allowing it to engage in cathodic protection. Additionally, the treatment protects the zinc when it is in aqueous condition, increasing the shelf-life and reactivity. The treated zinc pigment is protected in the waterborne system, while still showing good cathodic protection once applied to the substrate.

The use of the treated zinc pigment provides benefits to manufacturers seeking to formulate with waterborne systems. Global regulations are mandating less usage of solvent and requiring OEMs to utilize aqueous formulations. Therefore, there is an unfulfilled market need to extend zinc-rich coatings to waterborne applications. The development described here provides a solution to making these waterborne zinc-rich coatings. The treated pigment is comprised of a surface treatment and a metal particle, whereby the surface treatment provides oxidation resistance in aqueous formulations but allows for cathodic protection upon applying the coating to a substrate.

DETAILED DESCRIPTION

A development related to a treated, metallic pigment for use in anticorrosion coatings is described. This development describes a metallic pigment treated with a transient passivation layer. The treatment protects the metal while it is in water and is deactivated once the metallic pigment is applied to a metal substrate. The treated metallic pigment may be formulated into waterborne systems, resulting in reduced gas generation and an extended shelf-life of the coating. An ink, paint or coating containing the treated metallic pigment of the present development will activate upon curing, providing both cathodic and anodic protection to ferrous metal substrates.

Usage of the treated, metallic pigment in waterborne coating systems allows for longer shelf-life of the formulation by preventing the metallic pigment from corroding in the system. The longer shelf life is evidenced by minimized $H_2$ gas generation as compared to untreated pigment. When formulated into coating systems and applied to a metal substrate, the treated metallic pigment maintains good cathodic corrosion protection to the metal substrate.

In one embodiment, the treated, metallic pigment is comprised of a metal pigment and at least one organic treatment chemical. Generally, the treated metallic pigment comprises 75-99.5% (wt/wt %) of a metal pigment and 0.25-25% (wt/wt %) of the organic treatment chemical. The treated metallic pigment may also comprise 1-10% (wt/wt %) of the organic treatment chemical. The metal pigment comprising the treated, metallic pigment may be a particulate material comprising a single or alloyed metal and a lubricant. Metal pigments may include one or more of the following elements: Zn, Mg, Cd, Al, Fe, Cr, Cu, and mixtures and alloys thereof. Similarly, the color of the metallic pigments may be any color including, silver, grey, copper, black or white. Typically, but not always, the color is determined by the shape of the pigments.

The treated metallic anticorrosion pigments of the current development may be any shape, including for example spherical, platelet shapes, acicular, or amorphous shaped. Additionally, the metallic pigment may be a mixture of shapes. The metallic pigments of the current development may also have a particle size and particle size distribution that varies depending on the application. The median of the particle size distribution (d50) is preferably in the range of 1 μm≤d50≤100 μm, and is more preferably in the range of 5 μm≤d50≤25 μm.

In one embodiment, the surface of the treated metallic anticorrosion pigment may be oxidized. If the surface of the treated metallic anticorrosion pigment is oxidized, then the oxide layer may be a compound $M_xR_y$, where M is a metal and R is a counterion that describes the oxide. The coefficients, x and y, represent the number of metal atoms (M) and counterion (R), respectively. The M of the oxide product may be the same metal that comprises the treated, metallic pigment or it may be a different metal. M may also represent a mixture of metals. Metals for the metal atom M may include one or more metals from the following list of Zn, Al, Mg, Cu, Cd, Si, Fe, Cr and Mn. The counterion (R) of the oxide product may be a single counterion or may be comprised of multiple counterions. Examples of suitable counterions R include, but are not limited to, one or more from the following list including, $O^{2-}$, $(OH)^-$, $(OOH)^-$, $S^{2-}$, $(CO_3)^{2-}$, $(HCO_3)^{1-}$, $(PO_4)^{3-}$, and mixtures thereof. The treated metallic anticorrosion pigment may contain up to 50% (wt/wt) $M_xR_y$.

The treated, metallic pigment may also contain a lubricant. Lubricants may be used as processing aids during the manufacture of the pigment. Typical lubricants used during the processing of the metallic pigment include all types of saturated and unsaturated fatty acids and mixtures thereof, including, but not limited to, stearic acid, oleic acid, linoleic acid, ricinoleic acid, palmitic acid, arachidic acid, myristic acid, lauric acid, capric acid, elaidic acid, erucic acid, linolenic acid, myristoleic acid, palmitoleic acid, and other fatty acids. The fatty acids used as the lubricant may be saturated or unsaturated and contain between 1-30 carbon atoms. The lubricant used may comprise between 0.1-10% by weight on total pigment.

In one embodiment, a treated, metallic pigment comprises a surface treatment with an organic treatment chemical as described below. Without being bound to theory, it is expected that the surface treatment prevents oxidation of the pigment until the pigment is added to an ink or paint and applied to a surface. After the treated anticorrosion pigment is applied to a surface, the treatment deactivates, allowing the treated metallic pigment to fully participate in cathodic protection. The treatment may undergo a physical change in size, shape, morphology, or porosity. The treatment may undergo a phase change in which it transitions from solid to gas or liquid to gas. The treatment may allow the treated metallic anticorrosion pigment to be formulated into waterborne systems without incompatibilities. The organic treatment chemical selected should not impede the zinc pigment's ability to provide cathodic protection to the substrate.

The pigment composition comprises a zinc pigment treated with a transient treatment, in which the treatment is may be added at 0.25-25% (by weight), or at 1-10% (by weight). The exact amount of treatment required depends on the morphology, size, and surface area of the metallic pigment substrate. The treatment may be homogenous or may be a mixture of different structures of which may be defined by Formula 1 and/or Formula 5. The treatment has a vapor pressure ranging from 0.0-0.1 mmHg at 20-30° C., and also from 0-0.045 mmHg at 20-30° C. The treatment is a solid and has a measurable vapor pressure at or near room temperature (20-30° C.). It is noted that silica, Comparative Example 12, has no vapor pressure and does not work for this product.

In addition, the treatment may maintain volatility and may be sublimable. Without being held to theory, the treatment must maintain ability to withstand complete volatilization at a rapid rate at ambient temperatures In one embodiment, the organic treatment chemical has a chemical structure according to the general Formula 1

(1)

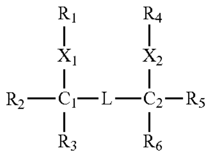

in which $C_1$ and $C_2$ are carbon atoms that are attached by an optional linker, L; $X_1$ and $X_2$ stand for either a O, N, or S atom, are independent of each other, and are covalently attached to carbon atoms $C_1$ and $C_2$, respectively; $R_1$, $R_2$, $R_4$, and $R_5$, are optional, independently organic groups or hydrogen atoms; and $R_3$ and $R_6$ are independently organic groups covalently attached to $C_1$ and $C_2$, respectively.

The carbon atoms, $C_1$ and $C_2$ may be covalently attached to each other, or they may be separated by an optional linker group, L. In the case where the carbon atoms, C1 and C2 are directly bonded to each other, they may be bonded by a single or a double bond. In the case where the optional linker group, L, is between the carbon atoms, $C_1$ and $C_2$, the optional linker group, L, may be comprised of 0-3 carbon atoms that are covalently linked by single or double bonds to each other and carbon atoms, $C_1$ and $C_2$.

The heteroatoms, $X_1$ and $X_2$ may be single or double bonded to the carbon atoms, $C_1$ and $C_2$. The heteroatoms, $X_1$ and $X_2$, may be O, N, and S. In one embodiment, $X_1$ and $X_2$ are both the same type of atom. In another embodiment, $X_1$ and $X_2$, are different atoms. In one embodiment, the heteroatoms, $X_1$ and $X_2$, are connected to an optional group $R_1$ and $R_4$, respectively. In one embodiment, only one of the groups $R_1$ and $R_4$ may be present and attached to $X_1$ and $X_2$. In another embodiment, both $R_1$ and $R_4$ may be present. $R_1$ and $R_4$ may be identical or they may be different functional groups without limiting the scope. In one embodiment, the optional group $R_1$ and $R_4$ may be hydrogen atoms or an organic group. In the case where $R_1$ and $R_4$ are an organic group, $R_1$ and $R_4$ may connect to functional groups $R_3$ and $R_6$, respectively, to form a ring system. In this case, the ring system may be aromatic, but it may also not be aromatic. In the case where a ring system is formed, the ring may comprise $R_1X_1C_1R_3$, and $R_4X_2C_2R_6$, respectively.

In one embodiment, the carbon atoms, $C_1$ and $C_2$, are bonded to the optional group $R_2$ and $R_5$, respectively. In one embodiment, only one of the groups $R_2$ and $R_5$ may be present and attached to $C_1$ and $C_2$. In another embodiment, both $R_2$ and $R_5$ may be present. $R_2$ and $R_5$ may be identical or they may be different functional groups without limiting the scope. In one embodiment, the optional group $R_2$ and $R_5$ may be hydrogen atoms or an organic group.

The carbon atoms, $C_1$ and $C_2$, are bonded to the groups $R_3$ and $R_6$, respectively. $R_3$ and $R_6$ may be identical or they may be different functional groups without limiting the scope. $R_3$ and $R_6$ may be connected to the heteroatoms $X_1$ and $X_2$ through functional groups $R_1$ and $R_4$, respectively, to form a ring system. In this case, the ring system may be aromatic, but it may also not be aromatic. In the case where a ring system is formed, the ring may comprise $R_1X_1C_1R_3$, and $R_4X_2C_2R_6$. The ring structure may be symmetrical with both $R_1X_1C_1R_3$, and $R_4X_2C_2R_6$ having identical structure, or it may be asymmetrical, where $R_1X_1C_1R_3$, and $R_4X_2C_2R_6$ have different structures. Alternatively, only one ring structure may be present, for example only $R_1X_1C_1R_3$, or only $R_4X_2C_2R_6$, without limiting the scope.

Examples of suitable ring systems include, but are not limited to, pyrrolidine, pyrroline, pyrrole, imidazolidine, pyrazoline, pyrazole, imidazole, triazole, furan, dioxolane, thiophene, oxazole, isoxazole, isothiazole, thiazole, oxathiolane, thiadizole, oxadiazole, piperidine, pyridine, piperazine, pyridazine, pyrimidine, pyrazine, triazine, pyran, dioxane, thiane, thiopyran, dithiane, purine, adenine, guanine, uracil, thymine, cytozine, xanthine, trithiane, morpholine, oxazine, thiomorpholine, thiazine, azepine, diazepine, oxepane, thiepine, azocane, and thiocane. The ring structure described may be substituted with linear or cyclic moieties. Substituents may include, but are not limited to an alkane, alkene, alkyne, amine, alcohol, ether, alkyl halide, ketone, aldehyde, nitrile, amide, ester and carboxylic acid. Additionally, $R_3$ may be connected to $R_6$ to form a ring system. In this case, the ring system may be aromatic, but it may also not be aromatic. In the case where a ring system is formed, the ring may comprise $C_1C_2LR_4R_6$.

In one embodiment, Formula 1 may be a molecule such as curcumin (Formula 2), 2,2'-bipyridine (Formula 3) or 8-hydroxyquinoline (Formula 4)

(2)

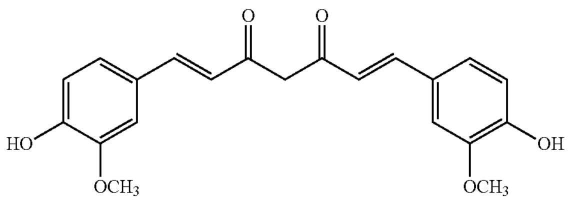

(3)

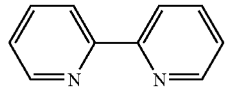

(4)

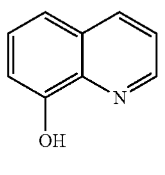

Other suitable treatments according to Formula 1 may include salicylic acid, guaiacol, thioguaiacol, maltol, thiomaltol hydroxypyridinone, benzil, acetylacetonoate, hexafluoroacetylacetone, trifluoroacetylacetone 1,2-cyclohexanedione, 1,2-cyclopentanedione, pyruvic acid, dimedone, substituted 1,3-diketones, acetonylacetone, glyoxalbis(mesitylimine), and 2,2'-biphenol.

In another embodiment, the organic treatment chemical has a chemical structure according to the general Formula 5

(5)

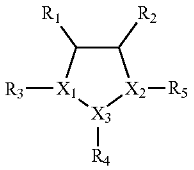

in which $X_1$, $X_2$ and $X_3$ are heteroatoms in a five-membered ring structure that are either C, O, N, or S atoms, are independent of each other, and may be connected by single or double bonds; $R_1$ and $R_2$ stand for independent organic groups that may be linked in a ring system or hydrogen atoms; $R_3$, $R_4$, and $R_5$, are optional, independent organic groups or hydrogen atoms.

The heteroatoms $X_1$, $X_2$ and $X_3$ may be one or more selected from the group comprising C, O, N, or S. The heteroatoms $X_1$, $X_2$ and $X_3$ are part of the 5-membered covalent ring system highlighted in Formula 5. There may be single or double bonds between any of the core atoms in the five-membered ring of Formula 5. In one embodiment, the heteroatoms $X_1$, $X_2$ and $X_3$ may be protonated. In this case, either one or all of $R_3$, $R_4$, and $R_5$ would be a hydrogen atom. In one embodiment, the heteroatoms $X_1$, $X_2$ and $X_3$ may be positively or negatively charged without limiting the scope of the development.

The groups $R_1$ and $R_2$ may be independent organic groups or hydrogen atoms. $R_1$ and $R_2$ may be identical or they may be different functional groups without limiting the scope. In one embodiment, the optional group $R_1$ and $R_2$ may be hydrogen atoms or an organic group. In the case where $R_1$ and $R_2$ are an organic group, the group may form a ring system where $R_1$ and $R_2$ are connected to each other.

The groups $R_3$, $R_4$, and $R_5$, are optional functional groups that may or may not be present, or they may be either a hydrogen atom or an organic group. In one embodiment, only one of the groups $R_3$, $R_4$, and $R_5$ may be present. In another embodiment, two $R_3$, $R_4$, and $R_5$ groups may be present. In another embodiment, all $R_3$, $R_4$, and $R_5$ groups may be present. $R_3$, $R_4$, and $R_5$ may be identical, or they may be different functional groups without limiting the scope.

Examples of suitable molecules that fit the structure described in Formula 5 include, but are not limited to, Pyrrolidine, Pyrroline, Pyrrole, Pyrazolidine, Imidazolidine, Triazole, Tetrahydrothiophene, thiophene, oxazole, isoazole, isothiazole, thiazole, oxathiolane, oxadiazole, thiadiazole, pyrrolizine, Indene, Indoline, Indole, Indolizine, Indazole, Benzimidazole, azaindole, azaindazole, purine, benzothiophene, benzoisoxazole, benzoisothiazole, benzoxazole, benzotriazole, benzothiazole, benzothiadiazole, adenine, guanine, histidine, proline, and tryptophan. The structure described may be substituted with linear or cyclic moieties. Substituents may include, but are not limited to an alkane, alkene, alkyne, amine, alcohol, ether, alkyl halide, ketone, aldehyde, nitrile, amide, ester and carboxylic acid. In one embodiment the Formula 5 may be a molecule such as benzotriazole (Formula 6), Benzimidazole (Formula 7), 3,5-dimethylpyrazole (Formula 8), or 1H-benzimidazole-6-carboxylic acid (Formula 9).

(6)

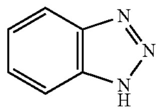

-continued (7)

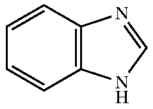

(8)

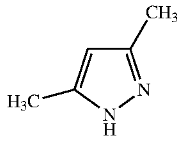

(9)

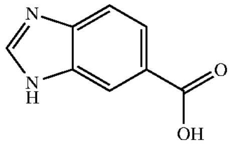

The organic treatment chemical ("treatment") may be composed of a single chemical or combination of more than one chemical. While not bound by theory, it is proposed that the organic treatment chemicals according to Formula 1 and Formula 5 interact with the surface of a metallic pigment via chemisorption creating a network structure that can be disrupted once the coating containing the pigment has been cured.

The pigment composition comprises a zinc pigment treated with a transient treatment, in which the treatment is may be added at 0.25-25% (by weight), or at 1-10% (by weight). The exact amount of treatment required depends on the morphology, size, and surface area of the metallic pigment substrate. The treatment may be homogenous or may be a mixture of different structures of which may be defined by Formula 1 and/or Formula 5. The treatment has a vapor pressure ranging from 0.0-0.1 mmHg at 20-30° C., and also from 0-0.045 mmHg at 20-30° C. The treatment is a solid and has a measurable vapor pressure at or near room temperature (20-30° C.). It is noted that silica, Comparative Example 12, has no vapor pressure and does not work for this product.

In addition, the treatment may maintain volatility and may be sublimable. The treatment chemical has a vapor pressure of greater than 0 mmHG but less than 0.1 mmHG at 20-30° C. Without being held to theory, the treatment must maintain ability to withstand complete volatilization at a rapid rate at ambient temperatures The precise method used to make the treated metallic pigment is not critical, and any method know to those skilled in the art may be used. In one instance, the treated metallic pigment is produced by combining a metallic pigment substrate with a treatment in a solvent, followed by mixing, and optionally drying. In one case the treatment and metallic pigment may be combined in the absence of a solvent. In one case, the treated metallic pigment is produced in a ball mill by adding the treatment to the precursor of the metallic pigment.

The treated metallic pigment of the current development may be used in any type of water- or solvent-based liquid coating known to a skilled formulator. In another embodiment, the coating binder may be organic, ceramic or a hybrid organic ceramic-based coating. In one embodiment, the coating may be a 1-part formulation. In another embodiment, the coating may have more than one part in its formulation. In general, the metallic pigment may be used in all types of coatings without limiting the scope of the development.

The water or solvent based liquid coating containing the treated metallic pigment may be characterized by its pigment volume concentration (PVC). The pigment volume concentration (PVC) is defined as the volume fraction of pigment particles with respect to the volume fraction of the total solids in a coating. The loading of the metallic pigment in the coating is such that its PVC is at or below the critical pigment volume concentration (CPVC). The CPVC is defined as the pigment volume concentration where there is just sufficient binder present in a coating to cover each pigment particle with a thin layer and the voids between particles are filled. It is defined by the following equation, where $\rho_p$ is the specific gravity of the treated metallic pigment, $\rho_o$ is the specific gravity of the oil, and OA is the oil absorption in grams oil to wet 100 grams pigment of the standard oil used for the system.

$$CPVC = \frac{1}{1 + OA\frac{\rho_p}{100 * \rho_o}} \qquad (3)$$

The oil absorption is typically determined by measuring the amount of liquid that 1 g of the treated metallic pigment can absorb before it wets, forming a stiff but spreadable paste that is shiny on the top. It is typically reported in grams oil/100 grams pigment. For this measurement, the oil may be any type of solvent typically used in solvent-or waterborne coatings, including linseed oil, castor oil, glycols, etc. without limiting the scope of the development.

The coating system containing the treated metallic pigment may be applied to all types of metal parts up to and including metal panels, screws, fasteners, brakes, automatic chassis components, without limiting the scope of the development. Coating systems containing the treated metallic pigment may be applied to many different metals and alloys including, but not limited to steel, iron, cast iron, wrought iron, elinvar, fernico, ferroalloys, invar, pig iron, iron hydride, kanthal, kovar, spiegeleisen, aluminum, and staballoy. The present development may be formulated into coating systems which offer additional benefits which include but are not limited to heat protection, structural reinforcement, impact resistance, abrasion resistance, friction control, and corrosion protection.

The present development has been described in detail, including the preferred embodiments thereof. However, it will be appreciated that those skilled in the art, upon consideration of the present disclosure, may make modifications and/or improvements on this development that fall within the scope and spirit of the development.

EXAMPLES

The development is further described by the following non-limiting examples which further illustrate the development, and are not intended, nor should they be interpreted to, limit the scope of the development.

Examples 1-11

General: 250 g of a pigment and 50 g of isopropyl alcohol were added to a planetary mixer and mixed for 15 min. A description of the pigments used in Examples 1-13 is provided in Table 1. A solution of treatment chemical in 10 g isopropyl alcohol and 2 g water was made. The treatment chemical solution was added to the pigment paste and mixed for 30 min. The treated paste was then transferred to a vacuum oven equipped with inert gas purging and dried at 60° C. for 12 hrs. The treatment chemical, amount of treatment chemical, and zinc pigment substrate used are outlined in Table 2.

TABLE 1

Description of metallic pigments used in Examples

| Pigment name | Manufacturer | Description |
|---|---|---|
| BendaLutz Z2031 | Sun Chemical | Amorphous zinc powder |
| BendaLutz Z1047 | Sun Chemical | 90% platelet shaped zinc paste in mineral spirits |
| Zinkpulver EE/C (319) | Sun Chemical | Zinc dust |

magnetic stir bar. The flask was placed into an oil bath on a stir plate, stirred at 400 rpm and the oil bath heated to 40° C. Once the flask contents were warmed, a glass gassing apparatus was connected to the flask. The glass gassing apparatus allows for gas flow from the flask into a water containing chamber. As hydrogen gas is generated, the water chamber becomes pressurized and displaces water from the chamber into a graduated reservoir. The amount of water displaced was monitored over time—more water displacement indicated more gas generation. Each test was run until failure which was defined as a displacement of >100 mL of water or until 30 days had passed. Results are reported as the number of days a sample sustained until failure. The longer the number of days to failure, the better the performance.

TABLE 2

Amount and type of treatment chemical used, vapor pressure of the treatment, metallic pigment substrate, gas test results and rust grade from Machu corrosion test are disclosed.

| Example | Zinc Substrate | Treatment Chemical | Vapor pressure of treatment (mmHg at 20-30° C.) | % (w/w) of Treatment on zinc | Gas Test (days to failure) | Rust Grade (Machu test) |
|---|---|---|---|---|---|---|
| 1 | Z2031 | Benzotriazole | 0.04 (20° C.) | 1.5 | 29 | 6 |
| 2 | Z2031 | Benzotriazole | 0.04 (20° C.) | 2.0 | 30 | 6 |
| 3 | Z2031 | Benzotriazole | 0.04 (20° C.) | 5.0 | 30 | 4 |
| 4 | Z2031 | Benzotriazole | 0.04 (20° C.) | 10.0 | 17 | n/a |
| 5 | Z2031 | Benzimidazole | $7.6 \times 10^{-5}$ (25° C.) | 2.0 | 30 | 5 |
| 6 | Z2031 | Curcumin | $3.1 \times 10^{-12}$ (25° C.) | 4.6 | 30 | 3 |
| 7 | Z2031 | Benzothiazole | 0.014 (25° C.) | 2.2 | 2 | 4 |
| 8 | Z2031 | Imidazole | 0.0023 (20° C.) | 1.2 | 6 | ~~5~~ |
| 9 | Z2031 | 2,2-bipyridine | $1.3 \times 10^{-5}$ (25° C.) | 2.6 | 2 | 5 |
| 10 | Z1047 | Benzotriazole | 0.04 (20° C.) | 2.0 | 30 | 5 |
| 11 | Zinkpulver EE/C (319) | Benzotriazole | 0.04 (20° C.) | 2.0 | >6 | n/a |
| 12 (Comp.) | Z2031 | Silica | 0.0 | 3.6 | 6 | 0 |
| 13 (Comp.) | Z2031 | n/a | n/a | — | <1 | 5 |
| 14 (Comp.) | Z1047 | n/a | n/a | — | <1 | 4 |
| 15 (Comp.) | Zinkpulver EE/C (319) | n/a | n/a | — | 6 | DID NOT SPRAY |

Comparative Example 12 (Based on Silica Treatment)

110.86 g zinc pigment Z2031 was added to an oil jacketed reactor with 310.0 g isopropyl alcohol and allowed to soak for 30 min. After the soak, the mixture was stirred at 360 rpm and heated to a rolling reflux, ~83° C. 19.56 g of TEOS (tetraethyl orthosilicate) was added to the reactor. 40.28 g of 3% ammonium hydroxide solution was added to the reactor slowly over 60 min. After the addition, the reaction held at constant temp and stir speed for 60 min. The slurry was drained from the reactor and filtered, then washed with isopropyl alcohol. The pigment was dried in a vacuum oven equip with inert gas purging to dry at 60° C. for 12 hr. to result in a dark metal powder.

Comparative Example 13 (No Treatment): Sun Chemical Zinc Pigment Z2031

Comparative Example 14 (No Treatment): Sun Chemical Zinc Pigment Z1047

Comparative Example 15 (No Treatment): Sun Chemical ZinkPulver EE/C (319) zinc dust

Gas Test

In a 250 mL Erlenmeyer flask, 6.6 g of pigment, 10 g of 2-butoxyethanol and 90 g of water was added with a The results of the gas test prove that the treated zinc pigment of the present development withstands gassing for a longer period of time than untreated zinc pigment. The advantage of formulating with the present development in a waterborne system allows for an extended shelf life in comparison to untreated zinc pigment. The exception is Comparative Example 12, which does withstand gassing, but performs very poorly in the Machu corrosion test.

Water-Based (WB) Paint & Spray Procedure

A WB paint system was made by first mixing the WB Paint system base formulation. The paint system base formulation can be found in Table 3. The base formulation was made by creating a stirring vortex of water and BYK-1710, then adding the ingredients of component 1 into the vortex in the order listed. This stirred for 5-10 min. once all components were added, then component 2 was added to the vortex. Component 3 was pre-mixed together then was last to be added to the vortex to complete the formulation of the paint base system. The final paint was made by combining 85.44 g base, 7.25 g deionized water, 1.2 g Nueodex Web Combi drier, and 55 g of pigment. The ingredients were mixed with a dispermat high shear mixer (1700 rpm) in a spray cup for 15 min. The paint was then sprayed onto an acetone-cleaned, non-coated steel panel (ACT 10162) via spray gun. The target film thickness applied at room temperature was 0.3-0.5 mil. The panels were then cured for 1 hr. at 100° C. and allowed to rest overnight. The back of the spray panels were sprayed with Rust-Oleum Professional High Performance Enamel 7578838 Flat Black in order to prevent front-to-back contamination of the test panels. Examples 11 and 15 were not sprayed due to their pigment's large particle size being unable to pass through the spray gun.

TABLE 3

Formulation for waterborne paint system base

| Component | Trade Name | Amount (g) (w/w %) |
|---|---|---|
| 1 | Water | 286 |
| | BYK-1710 | 4.5 |
| | DOW Acrysol RM-8W | 7.5 |
| | DOW AMP-95 | 8 |
| | BYK Disperbyk-190 | 60.5 |
| 2 | DSM Uradil AZ 800 | 2566 |
| 3 | Water | 98 |
| | BYK-349 | 6 |
| | Halox 570 Powder | 9 |
| | DOW Acrysol RM-2020 NPR | 7 |

Machu Test

Sprayed panels were tested for their corrosion resistance abilities in the Machu test. A solution of 10 g NaCl salt, 10 g gl. acetic acid and 5 g 30% hydrogen peroxide was added to a 1 L volumetric flask, the remaining volume filled with DI water. The solution was inverted/mixed to dissolve all components. The solution was emptied into a 1 L beaker, then a test panel submerged in the solution for 48 hrs. After 48 hrs., the panels were removed and rinsed with DI and evaluated via ASTM D610-08 for rust grade as reported in Table 3. A low rust grade represents a more corroded panel, whereas a high rust grade indicates better corrosion protection. A control panel was sprayed which did not contain a pigment and resulted in a rust grade of 0 (very poor). Although Comparative Example 12 showed gas resistance, it exhibited poor corrosion resistance. Comparative Examples 13 & 14 showed corrosion protection but performed poorly for the gas test. Note that none of the comparative examples exhibited the combination of gas and corrosion resistance that is evident in the inventive examples.

The invention claimed is:

1. A treated metallic zinc pigment comprising a surface treatment with an organic treatment chemical, wherein the treated metallic zinc pigment comprises 75-99.5% wt/wt % of a zinc pigment and 0.25-25% wt/wt % of an organic treatment chemical of Formula 5, having a vapor pressure of 0-0.045 mmHg at 20-30° C., (5)

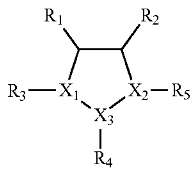

where $X_1$, $X_2$ and $X_3$ are heteroatoms in a five-membered ring structure that are either C, O, N, or S atoms, are independent of each other, and may be connected by double bonds; $R_1$ and $R_2$ stand for independent organic groups that may be linked in a ring system or hydrogen atoms; $R_3$, $R_4$, and $R_5$, are optional, independent organic groups or hydrogen atoms, wherein if a solvent is a component of the surface treatment, the treated metallic zinc pigment is subjected to drying.

2. The treated metallic zinc pigment of claim 1, comprising 90-99% wt/wt % of a zinc pigment and 1-10% wt/wt % of an organic treatment chemical.

3. The treated metallic zinc pigment of claim 1, where the zinc pigment is spherical, platelet shaped, acicular, or amorphous shaped, and mixtures thereof.

4. The treated metallic zinc pigment of claim 1, where the zinc pigment has a median particle size distribution (d50) from 1 μm≤d50≤100 μm, wherein the zinc pigment has a median particle size distribution (d50) in the range of 5 μm≤d50≤25 μm.

5. The treated metallic zinc pigment of claim 1 further comprising a lubricant selected from saturated and unsaturated fatty acids and mixtures thereof.

6. The treated metallic zinc pigment of claim 1, wherein Formula 5 is selected from the group consisting of Pyrrolidine, Pyrroline, Pyrrole, Pyrazolidine, Imidazolidine, Triazole, Tetrahydrothiophene, thiophene, oxazole, isoazole, isothiazole, thiazole, oxathiolane, oxadiazole, thiadiazole, pyrrolizine, Indene, Indoline, Indole, Indolizine, Indazole, Benzimidazole, azaindole, azaindazole, purine, benzothiophene, benzoisoxazole, benzoisothiazole, benzoxazole, benzotriazole, benzothiazole, benzothiadiazole, adenine, guanine, histidine, proline, and tryptophan and combinations thereof.

7. A metal part comprising the treated metallic zinc pigment of claim 1.

8. The metal part of claim 7, wherein the metal part is selected from the group consisting of steel, iron, cast iron, wrought iron, elinvar, fernico, ferroalloys, invar, pig iron, iron hydride, kanthal, kovar, spiegeleisen, aluminum, and staballoy.

9. A paint comprising the treated metallic zinc pigment of claim 1.

10. An ink comprising the treated metallic zinc pigment of claim 1.

11. A coating system comprising the treated metallic zinc pigment of claim 1.

12. The coating system of claim 11 wherein the coating system is applied to metals and alloys.

13. The coating system of claim 12 wherein the metals and metal alloys comprise steel, iron, cast iron, wrought iron, elinvar, fernico, ferroalloys, invar, pig iron, iron hydride, kanthal, kovar, spiegeleisen, aluminum, and staballoy.

14. The coating system of claim 11 which is applied to metal parts comprising metal panels, screws, fasteners, brakes, automatic chassis components.

15. The treated metallic zinc pigment of claim 6, wherein Formula 5 is selected from the group consisting of benzimidazole, benzotriazole and benzothiazole.

* * * * *